United States Patent
Henry

(10) Patent No.: US 11,932,159 B2
(45) Date of Patent: Mar. 19, 2024

(54) AIR CONTROL VALVE ASSEMBLY

(71) Applicant: Steven C. Henry, Shreveport, LA (US)

(72) Inventor: Steven C. Henry, Shreveport, LA (US)

( * ) Notice: Subject to any disclaimer, the term of this patent is extended or adjusted under 35 U.S.C. 154(b) by 317 days.

(21) Appl. No.: 17/516,818

(22) Filed: Nov. 2, 2021

(65) Prior Publication Data
US 2023/0133712 A1  May 4, 2023

(51) Int. Cl.
| | | |
|---|---|---|
| *B60P 3/22* | (2006.01) | |
| *B60D 1/64* | (2006.01) | |
| *B60P 1/60* | (2006.01) | |
| *B60T 13/40* | (2006.01) | |

(52) U.S. Cl.
CPC ............. *B60P 3/225* (2013.01); *B60D 1/64* (2013.01); *B60P 1/60* (2013.01); *B60P 3/2245* (2013.01); *B60T 13/403* (2013.01)

(58) Field of Classification Search
CPC .............. B60P 3/225; B60P 1/60; B60D 1/64
USPC ....................................................... 285/65–79
See application file for complete search history.

(56) References Cited

U.S. PATENT DOCUMENTS

| | | | | |
|---|---|---|---|---|
| 509,114 A | * | 11/1893 | Beery ................. | F16L 19/0218 285/379 |
| 3,219,275 A | * | 11/1965 | Green ..................... | B65F 7/005 239/533.15 |
| 3,758,137 A | * | 9/1973 | Kershaw ............... | F16L 37/252 285/379 |
| 3,831,984 A | * | 8/1974 | Kutina .................. | F16L 37/252 285/379 |
| 4,131,214 A | * | 12/1978 | Rogers .................... | B60P 3/225 222/399 |
| 5,348,043 A | * | 9/1994 | Chimera ............... | F16L 37/256 137/559 |
| 5,388,864 A | * | 2/1995 | Kozinski ............... | B60T 17/043 285/82 |
| 5,476,154 A | * | 12/1995 | Sage .................. | F01M 11/0458 184/57 |
| 5,570,813 A | * | 11/1996 | Clark, II .................. | F16N 7/30 222/394 |
| 5,779,277 A | * | 7/1998 | Street .................... | F16L 37/252 285/86 |
| D396,730 S | | 8/1998 | Schaupp | |
| 5,842,724 A | * | 12/1998 | Kozinski ............... | F16L 37/256 285/65 |
| 6,457,921 B1 | | 10/2002 | Freeman | |

(Continued)

FOREIGN PATENT DOCUMENTS

WO    WO2019034296    2/2019

*Primary Examiner* — Paul R Durand
*Assistant Examiner* — Michael J. Melaragno

(57) ABSTRACT

An air control valve assembly includes a semi-tractor that has an air brake system and a tanker trailer for containing a liquid. A gladhand air fitting is fluidly attachable to the air brake system and a valve is fluidly coupled to the gladhand air fitting. The valve is positionable in an open position to pass air through the valve and the valve is positionable in a closed position to inhibit air from passing through the valve. An air king fitting is fluidly coupled to the valve to receive the compressed air from the valve when the valve is in the open position. The air king fitting is releasably matable to the tanker trailer having the air king fitting. In this way the air king fitting can pressurize the interior of the tanker trailer for discharging fluid contained in the tanker trailer.

9 Claims, 5 Drawing Sheets

(56) References Cited

U.S. PATENT DOCUMENTS

| | | | | |
|---|---|---|---|---|
| 6,669,237 B1 * | 12/2003 | Burch | ................... | F16L 37/256 |
| | | | | 285/87 |
| 6,705,478 B1 * | 3/2004 | Engle | ...................... | B60D 1/64 |
| | | | | 213/1.3 |
| 6,948,887 B1 * | 9/2005 | Yielding | ................ | B65G 53/36 |
| | | | | 406/146 |
| 8,061,715 B2 * | 11/2011 | Jimenez | ................ | F16J 15/062 |
| | | | | 285/67 |
| 8,245,889 B1 * | 8/2012 | Starns | .................. | B67D 7/0238 |
| | | | | 222/481.5 |
| 10,377,198 B1 * | 8/2019 | Fields | ................. | H01R 31/065 |
| 10,933,854 B2 | 3/2021 | Bruett | | |
| 2007/0186956 A1 * | 8/2007 | Schlueter | ............... | B60S 1/64 |
| | | | | 134/123 |
| 2008/0044299 A1 | 2/2008 | Cobb | | |
| 2008/0223660 A1 * | 9/2008 | Williams | ........... | F01M 11/0458 |
| | | | | 222/399 |
| 2010/0278663 A1 | 11/2010 | Weflen | | |
| 2011/0133430 A1 | 6/2011 | Morris | | |
| 2014/0319871 A1 * | 10/2014 | Gan | ..................... | B62D 35/001 |
| | | | | 296/180.2 |
| 2017/0210397 A1 * | 7/2017 | Aiken | .................. | F16L 37/256 |
| 2020/0207319 A1 | 7/2020 | Van Thiel | | |
| 2020/0223411 A1 | 7/2020 | Richter | | |
| 2023/0133712 A1 * | 5/2023 | Henry | ...................... | B60P 1/60 |
| | | | | 137/351 |
| 2023/0242029 A1 * | 8/2023 | Maiorana | ............... | B65D 90/02 |
| | | | | 280/839 |

* cited by examiner

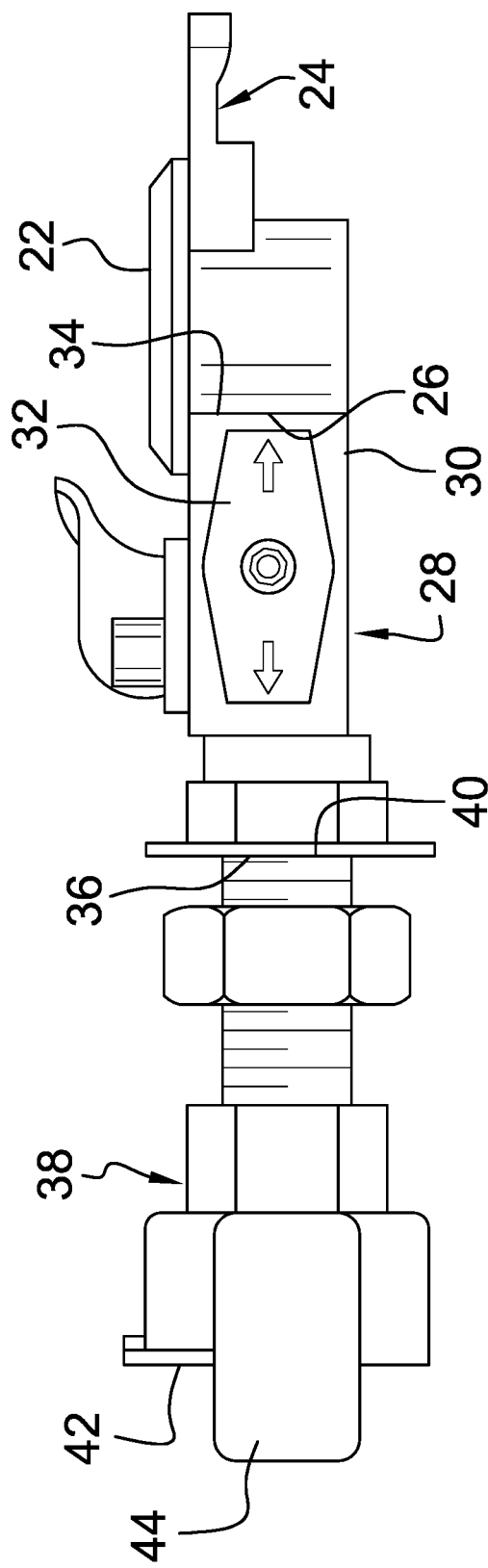
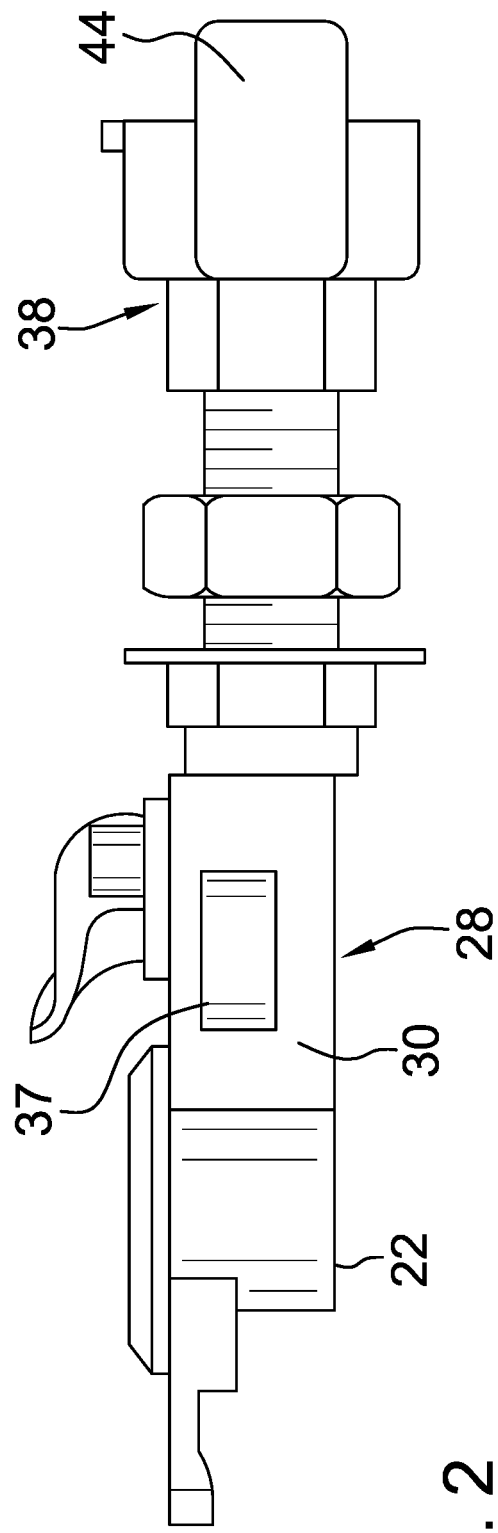
FIG. 1
FIG. 2

AIR CONTROL VALVE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to control valve devices and more particularly pertains to a new control valve device for employing an air brake system of a semi-tractor pressurize a tanker trailer for discharging fluid from the tanker trailer. The device includes a gladhand air fitting, a valve that is fluidly coupled to the gladhand air fitting and an air king fitting that is fluidly coupled to the valve. The gladhand air fitting is fluidly attachable to the air brake system of the semi-tractor and the air king fitting is fluidly attachable to the tanker trailer to pressurize the tanker trailer. The prior art discloses a pressure washer device that employs air pressure from an air brake system of a semi-tractor.

(2) Description of Related Art Including Information Disclosed Under 37 CFR 1.97 and 1.98

The prior art relates to control valve devices including an inflation device that includes a fitting that is fluidly attachable to an air brake system of a cargo trailer and a deflated air bag for inflating the deflated air bag. The prior art discloses a variety of compressor systems that are extrinsic with respect to a tanker trailer and which can be fluidly coupled to the tanker trailer for pressurizing the tanker trailer. The prior art discloses an air brake connection system for placing air brakes of a cargo trailer in fluid communication with an air brake system of a semi-tractor.

BRIEF SUMMARY OF THE INVENTION

An embodiment of the disclosure meets the needs presented above by generally comprising a tanker trailer for containing a liquid. A gladhand air fitting is fluidly attachable to the air brake system and a valve is fluidly coupled to the gladhand air fitting. The valve is positionable in an open position to pass air through the valve and the valve is positionable in a closed position to inhibit air from passing through the valve. An air king fitting is fluidly coupled to the valve to receive the compressed air from the valve when the valve is in the open position. The air king fitting is releasably matable to the tanker trailer having the air king fitting. In this way the air king fitting can pressurize the interior of the tanker trailer for discharging fluid contained in the tanker trailer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a right side view of an air control valve assembly according to an embodiment of the disclosure.

FIG. 2 is a left side view of an embodiment of the disclosure.

DETAILED DESCRIPTION OF THE INVENTION

Figure 3:
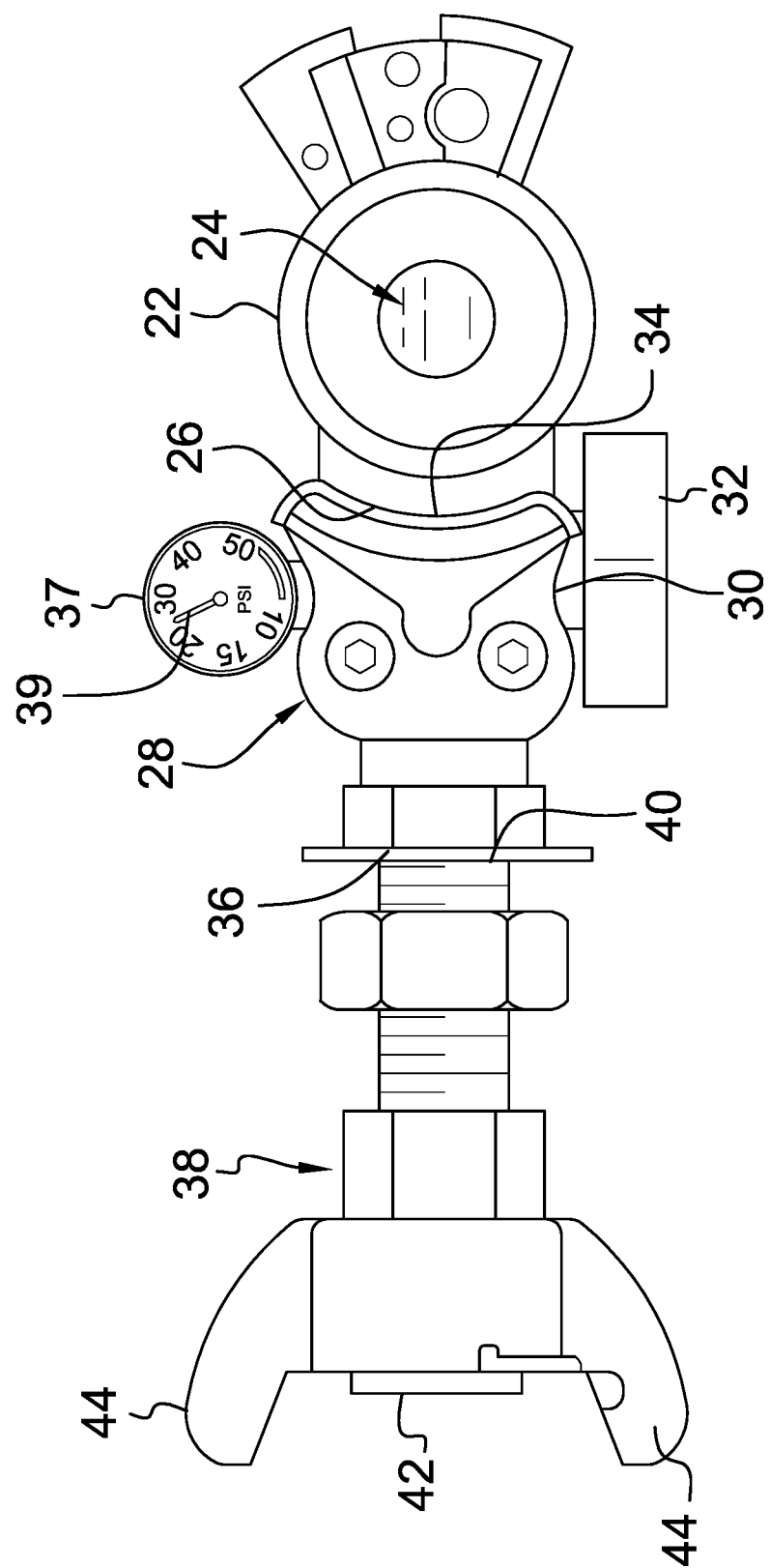
FIG. 3 is a top view of an embodiment of the disclosure.
Figure 4:
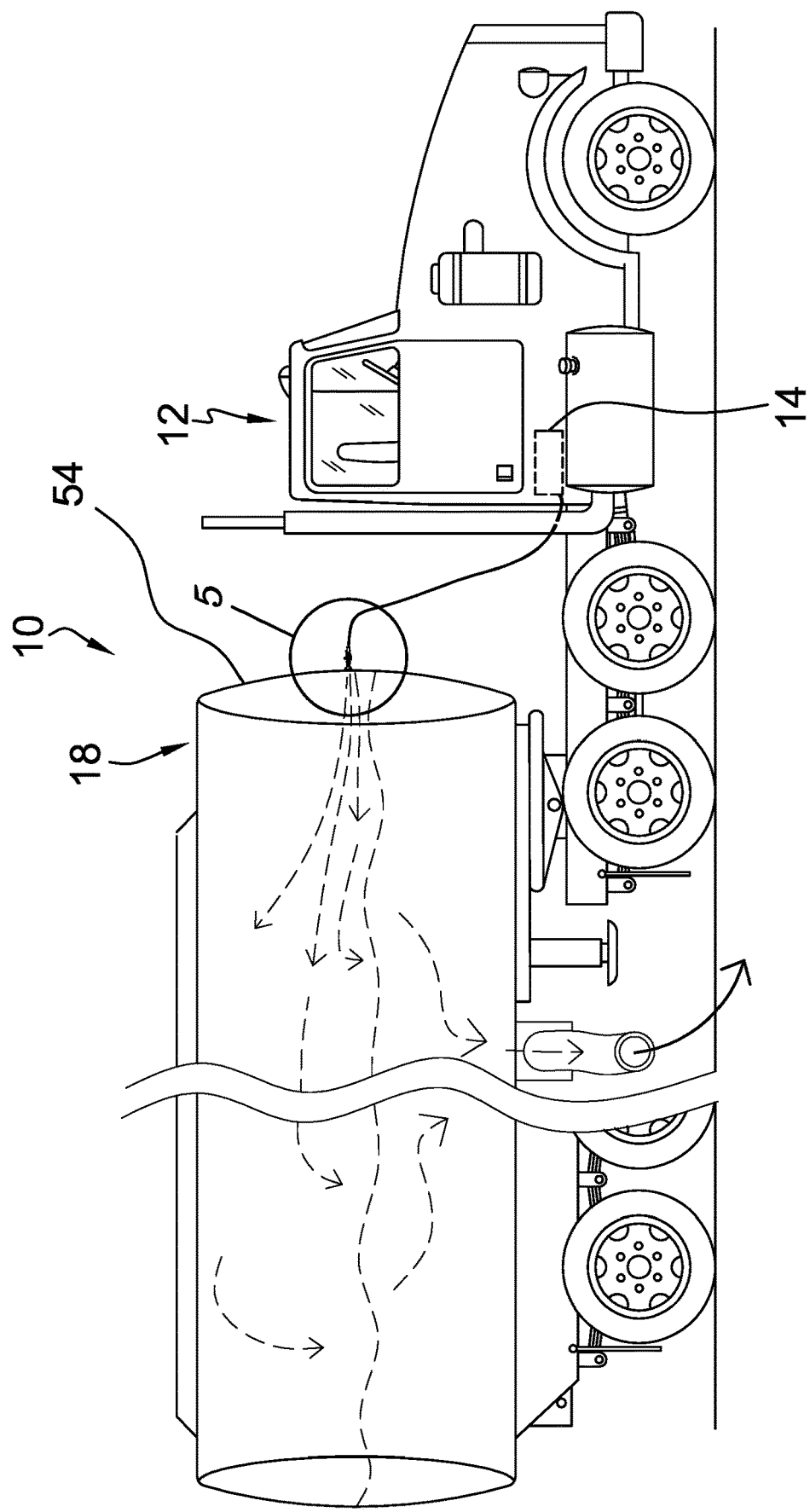
FIG. 4 is a perspective in-use view of an embodiment of the disclosure.
Figure 5:
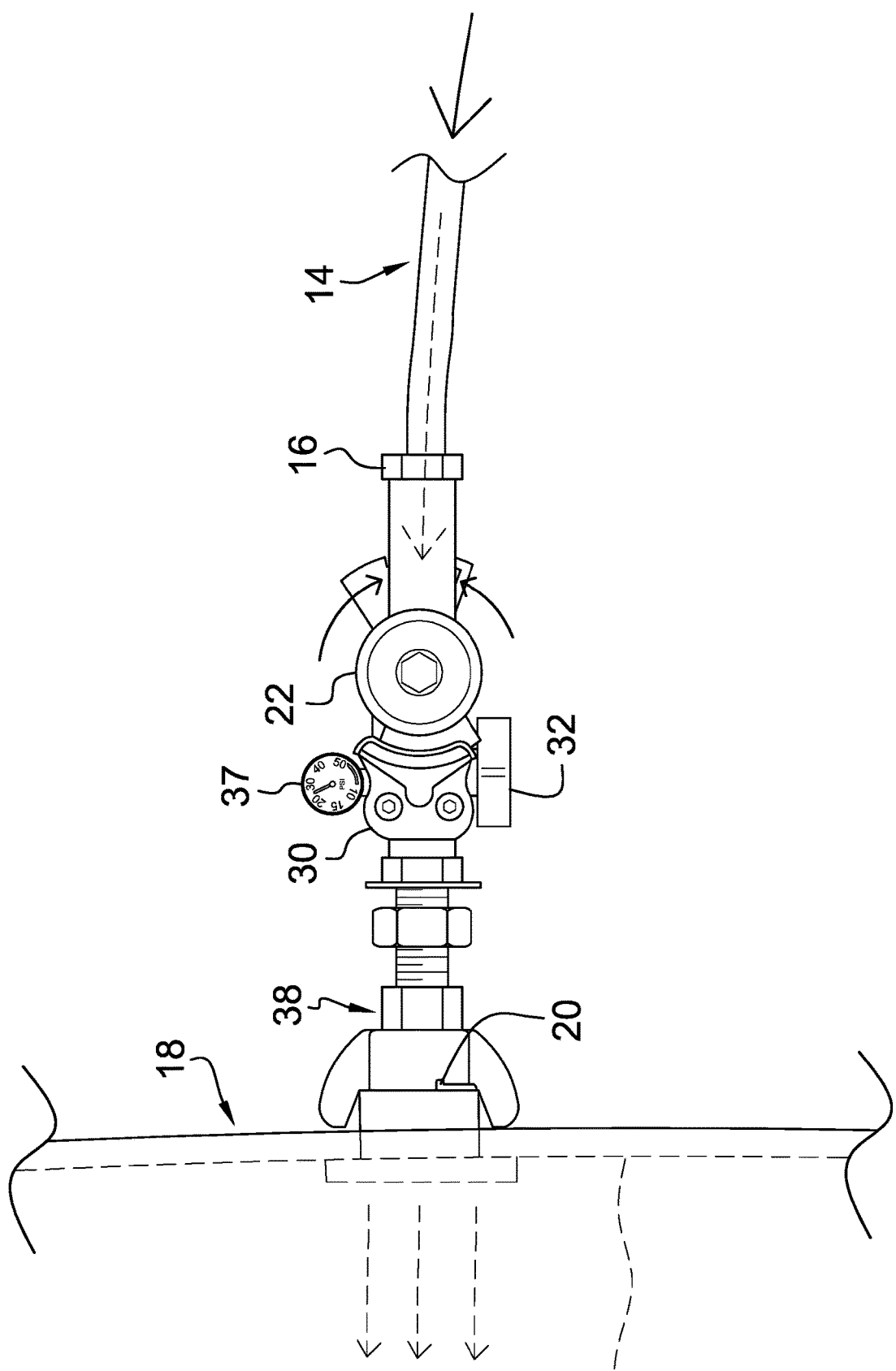
FIG. 5 is a top perspective in-use view of an embodiment of the disclosure.

With reference now to the drawings, and in particular to FIGS. 1 through 6 thereof, a new control valve device embodying the principles and concepts of an embodiment of the disclosure and generally designated by the reference numeral 10 will be described.

As best illustrated in FIGS. 1 through 6, the air control valve assembly 10 generally comprises a semi-tractor 12 that has an air brake system 14. The air brake system 14 has an output port 16 to output compressed air produced by the air brake system 14. A tanker trailer 18 is provided which contains a liquid cargo. The liquid cargo may be a hazardous liquid, an inert liquid or any other liquid that would typically be transported via over the road trucking. The tanker trailer 18 has an air input 20 is integrated into the tanker trailer 18 to facilitate air to be directed into the tanker trailer 18. A gladhand air fitting 22 is fluidly attachable to the air brake system 14 and the gladhand air fitting 22 has an input 24 and an output 26. The input 24 engages the output port 16 such that the gladhand air fitting 22 is in fluid communication with the output port 16 when the gladhand air fitting 22 is fluidly attached to the output port 16. The gladhand air fitting 22 may be a gladhand air fitting of any conventional design that is commonly employed on commercial vehicles with air brakes.

A valve 28 is fluidly coupled to the gladhand air fitting 22 and the valve 28 is positionable in an open position to pass air through the valve 28. Conversely, the valve 28 is positionable in a closed position to inhibit air from passing through the valve 28. The valve 28 has a housing 30 and a handle 32 that is rotatably coupled to the housing 30 such that the handle 32 can be manipulated. The housing 30 has an inlet 34 and an outlet 36, and the inlet 34 of the housing 30 is fluidly coupled to the input 24 of the gladhand air fitting 22. In this way the valve 28 can receive the compressed air from the air brake system 14. A pressure gauge 37 is fluidly coupled to the housing 30 of the valve 28 such that the pressure gauge 37 is in fluid communication with the air brake system 14 of the semi-tractor 12. The pressure gauge 37 includes an indicator 39 for indicating the pressure of the compressed air that is being introduced into the tanker trailer 18.

An air king fitting 38 is provided and the air king fitting 38 is fluidly coupled to the valve 28. In this way the air king fitting 38 can receive the compressed air from the valve 28 when the valve 28 is in the open position. The air king fitting 38 is releasably matable to the tanker trailer 18 having the air king fitting 38 being in fluid communication with an interior of the tanker trailer 18. In this way the air king fitting 38 facilitates the compressed air to pressurize the interior of the tanker trailer 18 for discharging fluid contained in the tanker trailer 18.

The air king fitting 38 has an inlet 40 and an outlet 42, and the air king fitting 38 has a pair of wings 44 each extending away from the outlet 36. Each of the wings 44 releasably engages the air input 20 on the tanker trailer 18 for releasably retaining the air king fitting 38 on the air input 20. Additionally, the input 24 of the air king fitting 38 is fluidly coupled to the outlet 36 of the housing 30 of the valve 28. In this way the input 24 of the air king fitting 38 receives the compressed air from the valve 28. The air king fitting 38 may be a dual lug air king fitting 38 of any conventional design that would commonly be found on a commercial vehicle that has air brakes.

Figure 6:
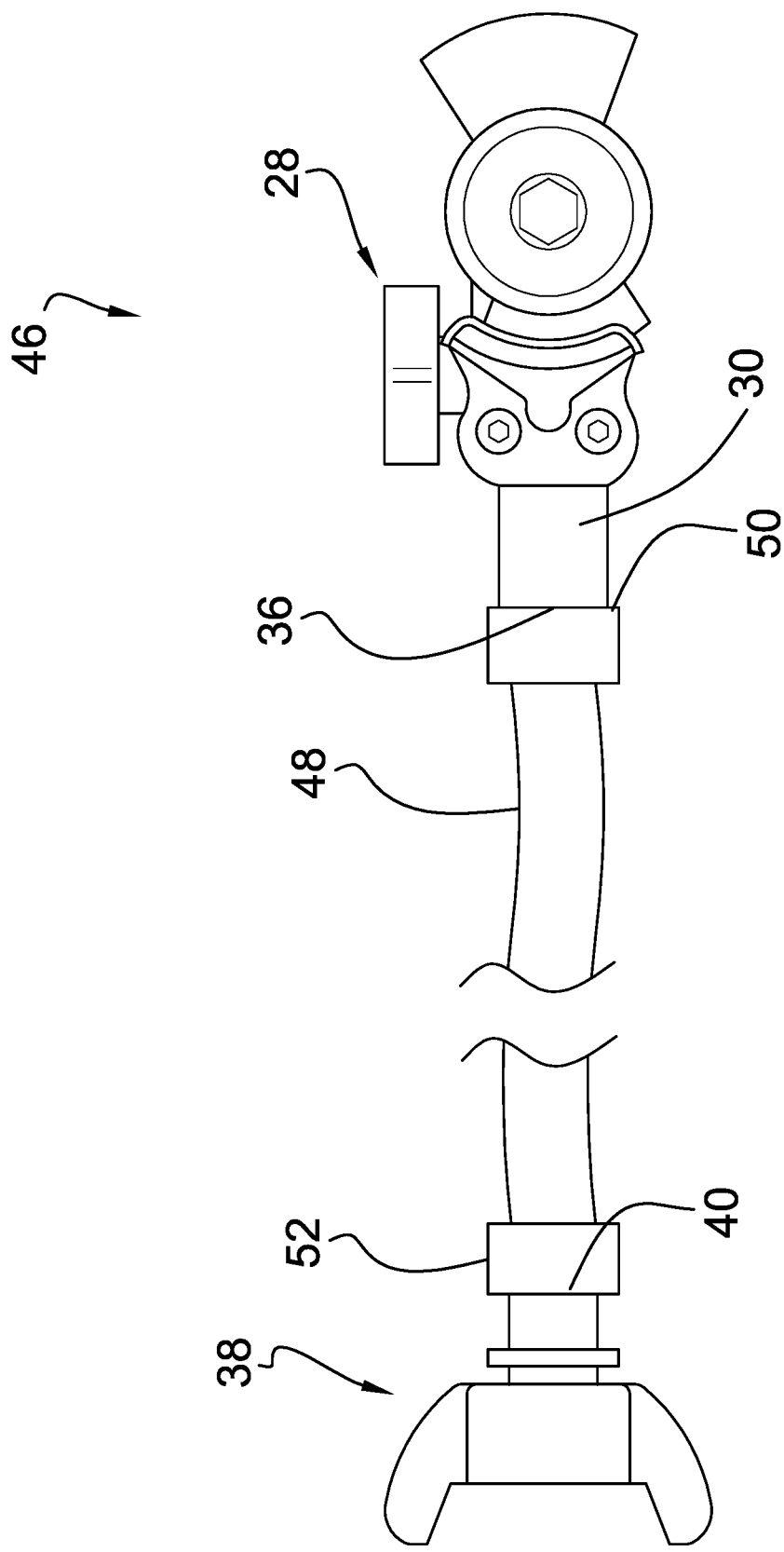
FIG. 6 is a perspective view of an alternative embodiment of the disclosure.

In an alternative embodiment 46 as is most clearly shown in FIG. 6, a hose 48 is provided which has a first end 50 and a second end 52. The first end 50 is fluidly coupled to the outlet 36 of the housing 30 of the valve 28 and the second end 52 is fluidly coupled to the inlet 40 of the air king fitting 38. In this way the air king fitting 38 can be moved a substantial distance from the valve 28. Thus, the hose can accommodate positioning of the air input 20 of the tanker trailer 18 when the air input 20 is positioned on a top of the tanker trailer 18 as is common with older generation tanker trailers. The hose 48 may have a length of at least 20.0 feet to facilitate the hose 48 to reach from a front end 54 of the tanker trailer 18 to the location of the air input 20.

In use, the gladhand air fitting 22 is fluidly coupled to the output port 16 of the air brake system 14 and the air king fitting 38 is fluidly coupled to the air input 20 on the tanker trailer 18. The handle 32 on the valve 28 is rotated into the first position thereby facilitating the air brake system 14 of the semi-tractor 12 to pressurize the interior of the tanker trailer 18. In this way the fluid in the tanker trailer 18 can be discharged by employing the existing air brake system 14 on the tractor trailer. Moreover, employing the existing air brake system 14 eliminates the need for performing costly modifications that would otherwise need to be performed on the semi-tractor 12 and the tanker trailer 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An air control valve assembly for routing compressed air from a semi-tractor into a tractor trailer to pressurize the tractor trailer for discharging a liquid stored in the tractor trailer, said assembly comprising:
   a semi-tractor having an air brake system;
   a tanker trailer being configured to contain a liquid;
   a gladhand air fitting being fluidly attachable to said air brake system;
   a valve being fluidly coupled to said gladhand air fitting, said valve being positionable in an open position wherein said valve is configured to pass air through said valve, said valve being positionable in a closed position wherein said valve is configured to inhibit air from passing through said valve; and
   an air king fitting being fluidly coupled to said valve wherein said air king fitting is configured to receive the compressed air from said valve when said valve is in said open position, said air king fitting being releasably matable to said tanker trailer having said air king fitting being in fluid communication with an interior of said tanker trailer wherein said air king fitting is configured to pressurize said interior of said tanker trailer for discharging fluid contained in said tanker trailer.

2. The assembly according to claim 1, wherein:
   said air brake system has an output port wherein said output port is configured to output compressed air produced by said air brake system; and
   said gladhand air fitting has an input and an output, said input engaging said output port such that said gladhand air fitting is in fluid communication with said output port when said gladhand air fitting is fluidly attached to said output port.

3. The assembly according to claim 2, wherein said valve has a housing and a handle being rotatably coupled to said housing wherein said handle is configured to be manipulated, said housing having an inlet and an outlet, said inlet of said housing being fluidly coupled to said input output of said gladhand air fitting wherein said valve is configured to receive the compressed air from said air brake system.

4. The assembly according to claim 3, wherein said valve is actuated into an open condition when said handle is rotated in a first direction, said valve being actuated into a closed condition when said handle is rotated in a second direction.

5. The assembly according to claim 3, wherein:
said tanker trailer has an air input being integrated into said tanker trailer wherein said air input is configured to facilitate air to be directed into the tanker trailer; and
said air king fitting has an inlet and an outlet, said air king fitting having a pair of wings each extending away from said outlet, each of said wings releasably engaging said air input on said tanker trailer for releasably retaining said air king fitting on said air input, said input of said air king fitting being fluidly coupled to said outlet of said housing of said valve wherein said input of said air king fitting is configured to receive the compressed air from said valve.

6. The assembly according to claim 1, wherein:
said air brake system has an output port wherein said output port is configured to output compressed air produced by said air brake system;
said tanker trailer has an air input being integrated into said tanker trailer wherein said air input is configured to facilitate air to be directed into the tanker trailer;
said gladhand air fitting has an input and an output, said input engaging said output port such that said gladhand air fitting is in fluid communication with said output port when said gladhand air fitting is fluidly attached to said output port;
said valve has a housing and a handle being rotatably coupled to said housing wherein said handle is configured to be manipulated, said housing having an inlet and an outlet, said inlet of said housing being fluidly coupled to said input output of said gladhand air fitting wherein said valve is configured to receive the compressed air from said air brake system, said valve is actuated into an open condition when said handle is rotated in a first direction, said valve being actuated into a closed condition when said handle is rotated in a second direction; and
said air king fitting has an inlet and an outlet, said air king fitting having a pair of wings each extending away from said outlet, each of said wings releasably engaging said air input on said tanker trailer for releasably retaining said air king fitting on said air input, said input of said air king fitting being fluidly coupled to said outlet of said housing of said valve wherein said input of said air king fitting is configured to receive the compressed air from said valve.

7. The assembly according to claim 6, further comprising a hose having a first end and a second end, said first end being fluidly coupled to said outlet of said housing of said valve, said second end being fluidly coupled to said input of said air king fitting thereby facilitating said air king fitting to be moved a substantial distance from said valve for accommodating positioning of the air input of the tanker trailer.

8. An air control valve system for routing compressed air from a semi-tractor into a tractor trailer to pressurize the tractor trailer for discharging a liquid stored in the tractor trailer, said system comprising:
a semi-tractor having an air brake system, said air brake system has an output port wherein said output port is configured to output compressed air produced by said air brake system;
a tanker trailer being configured to contain a liquid, said tanker trailer has an air input being integrated into said tanker trailer wherein said air input is configured to facilitate air to be directed into the tanker trailer;
a gladhand air fitting being fluidly attachable to said air brake system, said gladhand air fitting has an input and an output, said input engaging said output port such that said gladhand air fitting is in fluid communication with said output port when said gladhand air fitting is fluidly attached to said output port;
a valve being fluidly coupled to said gladhand air fitting, said valve being positionable in an open position wherein said valve is configured to pass air through said valve, said valve being positionable in a closed position wherein said valve is configured to inhibit air from passing through said valve, said valve has a housing and a handle being rotatably coupled to said housing wherein said handle is configured to be manipulated, said housing having an inlet and an outlet, said inlet of said housing being fluidly coupled to said input output of said gladhand air fitting wherein said valve is configured to receive the compressed air from said air brake system; and
an air king fitting being fluidly coupled to said valve wherein said air king fitting is configured to receive the compressed air from said valve when said valve is in said open position, said air king fitting being releasably matable to said tanker trailer having said air king fitting being in fluid communication with an interior of said tanker trailer wherein said air king fitting is configured to pressurize said interior of said tanker trailer for discharging fluid contained in said tanker trailer, said air king fitting has an inlet and an outlet, said air king fitting having a pair of wings each extending away from said outlet, each of said wings releasably engaging said air input on said tanker trailer for releasably retaining said air king fitting on said air input, said input of said air king fitting being fluidly coupled to said outlet of said housing of said valve wherein said input of said air king fitting is configured to receive the compressed air from said valve.

9. A method of discharging liquid from a tanker trailer with compressed air, the steps of the method comprising:
providing a semi tractor having an airbrake system, said air brake system having an output port;
providing a tanker trailer having an input port being in fluid communication with an interior of said tanker trailer;
providing a gladhand air fitting;
providing a valve being actuatable between an open condition and a closed condition;
providing an air king fitting;
attaching said valve to said gladhand air fitting;
attaching said air king fitting said valve;
attaching said gladhand air fitting to said output port of said airbrake system wherein said gladhand air fitting is configured to direct the compressed air into said valve;
attaching said air king fitting to said input port of said of said tanker trailer; and
manipulating said valve into said open condition wherein said air brake system of said tractor trailer is configured to pressurize said interior of said tanker trailer thereby facilitating the liquid to be discharged from said tanker trailer.

* * * * *